United States Patent
Yeom et al.

(10) Patent No.: US 8,368,765 B2
(45) Date of Patent: Feb. 5, 2013

(54) AUTO STABILIZATION METHOD AND PHOTOGRAPHING APPARATUS USING THE SAME

(75) Inventors: Dong-hae Yeom, Suwon-si (KR); Joong-eon Seo, Yongin-si (KR); Soo-yul Jung, Hwaseong-si (KR); Nam-joon Park, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 11/941,287

(22) Filed: Nov. 16, 2007

(65) Prior Publication Data

US 2008/0260367 A1    Oct. 23, 2008

(30) Foreign Application Priority Data

Apr. 17, 2007  (KR) ................................. 2007-37456

(51) Int. Cl.
*H04N 5/228* (2006.01)

(52) U.S. Cl. .................................. 348/208.4; 348/208.2

(58) Field of Classification Search .. 348/208.99–208.6, 348/208.14, 208.13, 208.2, 208.3, 208.1, 348/208.5
See application file for complete search history.

(56) References Cited

U.S. PATENT DOCUMENTS

| 5,652,918 | A  | * | 7/1997 | Usui ................................. 396/55 |
| 6,778,768 | B2 | * | 8/2004 | Ohkawara et al. ............... 396/55 |
| 2002/0047906 | A1 | * | 4/2002 | Ohta ............................ 348/208 |
| 2002/0051635 | A1 | * | 5/2002 | Morofuji ......................... 396/55 |
| 2005/0254806 | A1 | * | 11/2005 | Noguchi ......................... 396/55 |
| 2006/0251410 | A1 | * | 11/2006 | Trutna, Jr. ....................... 396/55 |

* cited by examiner

*Primary Examiner* — Lin Ye
*Assistant Examiner* — Euel Cowan
(74) *Attorney, Agent, or Firm* — Stanzione & Kim, LLP

(57) ABSTRACT

An auto stabilization method and a photographing apparatus using the same are provided. The photographing apparatus having the auto stabilization function includes a voice coil motor actuator (VCMA) to move a photographing element. In the generation of hand tremor, the photographing apparatus controls compensating of the hand tremor. Because one or more dynamic characteristics according to a structure of the VCMA is considered, saturation or delay of displacement of the VCMA is avoided, and a clearer image is provided.

25 Claims, 12 Drawing Sheets

AUTO STABILIZATION METHOD AND PHOTOGRAPHING APPARATUS USING THE SAME

CROSS-REFERENCE TO RELATED APPLICATIONS

This application claims priority under 35 U.S.C. §119(a) from of Korean Patent Application No. 10-2007-0037456, filed on Apr. 17, 2007, in the Korean Intellectual Property Office, the disclosure of which is hereby incorporated herein in its entirety by reference.

BACKGROUND OF THE INVENTION

1. Field of the Invention

The present general inventive concept relates to an auto stabilization method and a photographing apparatus using the same. More particularly, the present general inventive concept relates to an auto stabilization method to compensate for hand tremor according to a driving characteristic of a photographing element employed in a photographing apparatus, and a photographing apparatus using the same.

2. Description of the Related Art

Generally, hand tremor of a photographing apparatus is generally compensated for by compensation of divergence of an optical axis due to vibration by driving a lens, compensation by driving a photographing element where an image is converged, and compensation by processing a signal of a photographed image.

Compensating for hand tremor by lens driving is inefficient for a compact and light apparatus, due to non-linearity of a lens in an optical compensation, and its requirement for a driving lens in a lens barrel. Compensating by signal processing may be the most appropriate for an economic, compact and light apparatus, as it requires no additional hardware. However, this method has fluctuation of compensation accuracy depending on the respective algorithm employed for signal processing, and has degraded performance compared to an optical compensation.

Compensating by driving a photographing element is an example of optical compensating. This method requires a driving system to drive a photographing element, but is far more efficient for a compact and light apparatus, than compensating by driving a lens.

One of the ways to drive a photographing element is to use a smooth impact drive mechanism (SIDM), which drives a photographing element by use of a piezo-electric element. SIDM adjusts a moving distance of a photographing element, by using a voltage applied to a piezo-electric element. In particular, SIDM gradually moves a photographing element to a desired location, repeatedly in an ultrasonic level cycle. Although the photographing element mounted on a rotary axis moves along, when the piezo-electric element is expanded gradually, the piezo-electric element may contract too fast for the photographing element to follow.

Accordingly, SIDM using a piezo-electric element has low responsiveness, and although it uses ultrasonic waves, SIDM may have a high frequency noise. Technical skills and costs are also required, to stack piezo-electric elements of a desired expansion and contraction. If a hand tremor compensation mechanism is not employed, additional structures such as a latch to fix a driving system are required, which is inappropriate for a compact and light apparatus.

Meanwhile, a method using a voice coil motor actuator (VCMA) has been proposed, modeling a free mass system, to drive a photographing element.

FIG. 1 illustrates a voice coil motor driving unit to drive a photographing element. Referring to FIG. 1, the voice coil motor driving unit includes a main frame 10, a yaw-axis driving frame 20 on the main frame 10, and a pitch-axis driving frame 30 mounted on the yaw-axis driving frame 20 and having a photographing element mounted thereon.

When an electric current flows through a coil of an actuator mounted on the main frame 10, the yaw-axis driving frame 20 having a magnet mounted thereon, and the pitch-axis driving frame 30 having a magnet are driven in a two-dimension with respect to the main frame 10 according to a magnetic force formed between the coil and the magnet. A ball 40 is inserted between the main frame 10 and the driving frames 20 and between the driving frames 20 and 30 to reduce friction. The ball 40 is moved along a ball guide 45 formed on corresponding surfaces of the main frame 10, the yaw-axis driving frame 20, and the pitch-axis driving frame 30 to accommodate the ball 40.

A photographing apparatus adopting a VCMA modeling a free mass system, has a smooth surface illuminance, and thus can provide advantages such as compactness and low power consumption, if a friction is not considered.

However, because no structure is provided to support the driving frames 20, 30 during a time that a control input is not applied, dynamic characteristic of a voice coil motor driving unit changes according to a posture of an apparatus due to influence of gravity.

Furthermore, displacement of the driving frames 20, 30 reaches maximum degree or it is slowed, if the ball guide 45 has a rough surface illuminance. For example, if the ball 40 is at an edge of the ball guide 45, the ball 40 would hit a wall of the ball guide 45 by the application of a control input, and as a result, the driving frames 20, 30 are not moved smoothly.

SUMMARY OF THE INVENTION

The present general inventive concept provides an auto stabilization method to control hand tremor compensation, in accordance with a dynamic characteristic of a voice coil motor driving unit, and a photographing apparatus adopting the same.

The present general inventive concept also provides an auto stabilization method to control hand tremor compensation such that displacement saturation or delay of movement are not generated due to surface illuminance of a ball guide and position of a ball, and a photographing apparatus adopting the same.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing a method of auto stabilization of a photographing apparatus. The method of auto stabilization may include generating a driving element control signal to drive a driving element to compensate for a vibration caused due to hand tremor according to one or more dynamic characteristics of the driving element which moves a photographing element with respect to a reference, adding a movement compensation signal of a driving element to control displacement of the driving element to the control signal, and outputting the control signal including the movement compensation signal to the driving element.

The generating may include generating the driving element control signal according to one or more dynamic characteristics according to at least one of sensitivity deterioration in low frequency band, sensitivity enhancement in high frequency band, position, and a size of an input of the driving element.

The generating may include setting the driving element control signal such that a gain cross frequency is generated in a middle frequency band which has a linearity among frequency responses of the driving element.

The generating may include generating the driving element control signal such that a low frequency gain is set with respect to a case having a lowest gain among frequency responses of the driving element in a low frequency band.

The generating may include generating the driving element control signal such that a phase margin in the gain cross frequency exceeds a predetermined level.

The generating may include generating the driving element control signal such that the phase margin in the gain cross frequency is approximately 30° or above.

The generating may include generating the driving element control signal such that a high frequency gain is set with respect to a case having a highest gain among responses of the driving element in a high frequency band.

The driving element may include a voice coil motor actuator (VCMA).

The outputting may include setting a frequency size of the driving element movement compensation signal based on a frequency size at which linearity is maintained stable among frequency responses of the driving element.

The outputting may include setting a size of the driving element movement compensation signal such that, if the movement compensation signal is applied at the set frequency size, a size of an error signal between the driving element control signal and an output signal in response to the driving element control signal does not exceed an allowable range, which is converted to a voltage level by using a transfer function between the driving element movement compensation signal and the error signal.

The foregoing and other aspects and utilities of the present general inventive concept may be achieved by providing a photographing apparatus. The photographing apparatus may include a photographing element to photograph an image, a driving unit on which the photographing element is mounted, to move the photographing element, and a controller to generate a driving unit control signal according to one or more dynamic characteristics of the driving unit to compensate for vibration caused due to hand tremor, and to add a driving unit movement compensation signal to control displacement of the driving unit to the driving unit control signal and output the driving unit control signal including the driving unit movement compensation signal to the driving unit.

The controller may generate the driving element control signal according to one or more dynamic characteristics according to at least one of sensitivity deterioration in a low frequency band, sensitivity enhancement in high frequency band, position, and a size of an input of the driving element.

The controller may set the driving element control signal such that a gain cross frequency is generated in a middle frequency band which has a linearity among frequency responses of the driving element.

The controller may generate the driving element control signal such that a low frequency gain is set with respect to a case having the lowest gain among frequency responses of the driving element in low frequency band.

The controller may generate the driving element control signal such that a phase margin in the gain cross frequency exceeds a predetermined level.

The controller may generate the driving element control signal such that the phase margin in the gain cross frequency is approximately 30° or above.

The controller may generate the driving element control signal such that a high frequency gain is set with respect to a case having a highest gain among responses of the driving element in a high frequency band.

The driving unit may include a voice coil motor actuator (VCMA).

The controller may set a frequency size of the driving element movement compensation signal based on the frequency size at which the linearity is maintained stable among frequency responses of the driving element.

The controller may set a size of the driving element movement compensation signal such that, if the movement compensation signal is applied at the set frequency size, a size of an error signal between the driving element control signal and an output signal in response to the driving element control signal does not exceed an allowable range, which is converted to a voltage level by using a transfer function between the driving element movement compensation signal and the error signal.

The foregoing and/or other aspects and utilities of the general inventive concept may also be achieved by providing an auto stabilization unit usable with a photographing apparatus, the auto stabilization unit, including a detecting unit to detect vibration, and a controller to compensate for the vibration by at least one of generating a driving unit control signal according to at least one of one or more dynamic characteristics of the driving unit of the photographing apparatus and adding a driving unit movement compensation signal to control displacement of the driving unit to the driving unit control signal.

The foregoing and/or other aspects and utilities of the general inventive concept may also be achieved by providing a photographing apparatus, including a photographing element to photograph an image, a driving unit coupled to the photographing element, and to move the photographing element, and a controller to compensate for vibration by at least one of generating a driving unit control signal according to at least one of one or more dynamic characteristics of the driving unit and adding a driving unit movement compensation signal to control displacement of the driving unit to the driving unit control signal.

The foregoing and/or other aspects and utilities of the general inventive concept may also be achieved by providing an auto stabilizing method of a photographing apparatus, the method including determining whether a vibration exists and, if so, generating a vibration compensation control signal according to one or more dynamic characteristics of a voice coil motor actuator (VCMA), and adding a driving unit movement compensating signal to the vibration compensation control signal.

The foregoing and/or other aspects and utilities of the general inventive concept may also be achieved by providing a method of operating an auto stabilization unit usable with a photographing apparatus, the method including detecting whether vibration exists and, if so, compensating for the vibration by at least one of generating a driving unit control signal according to at least one of one or more dynamic characteristics of the driving unit of the photographing apparatus and adding a driving unit movement compensation signal to control displacement of the driving unit to the driving unit control signal.

The foregoing and/or other aspects and utilities of the general inventive concept may also be achieved by providing computer-readable recording medium having embodied thereon a computer program to execute a method, wherein the method includes determining whether a vibration exists and, if so, generating a vibration compensation control signal according to one or more dynamic characteristics of a voice coil motor actuator (VCMA), and adding a driving unit movement compensating signal to the vibration compensation control signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

Throughout the drawings, the same drawing reference numerals will be understood to refer to the same elements, features and/or structures.

DETAILED DESCRIPTION OF THE PREFERRED EMBODIMENTS

Figure 1:
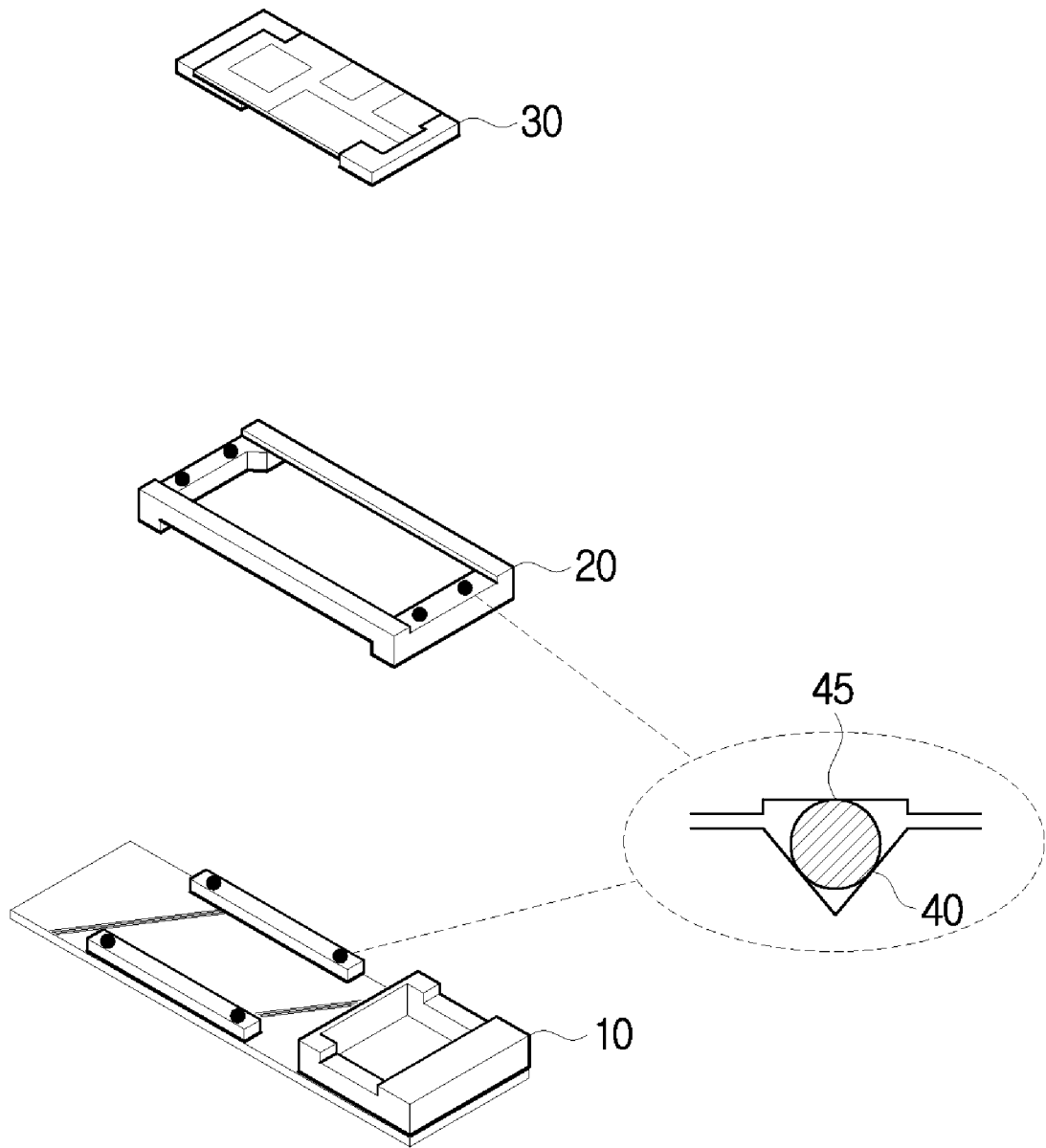
FIG. 1 is a view illustrating a voice coil motor driving (VCMD) unit to drive a photographing element.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
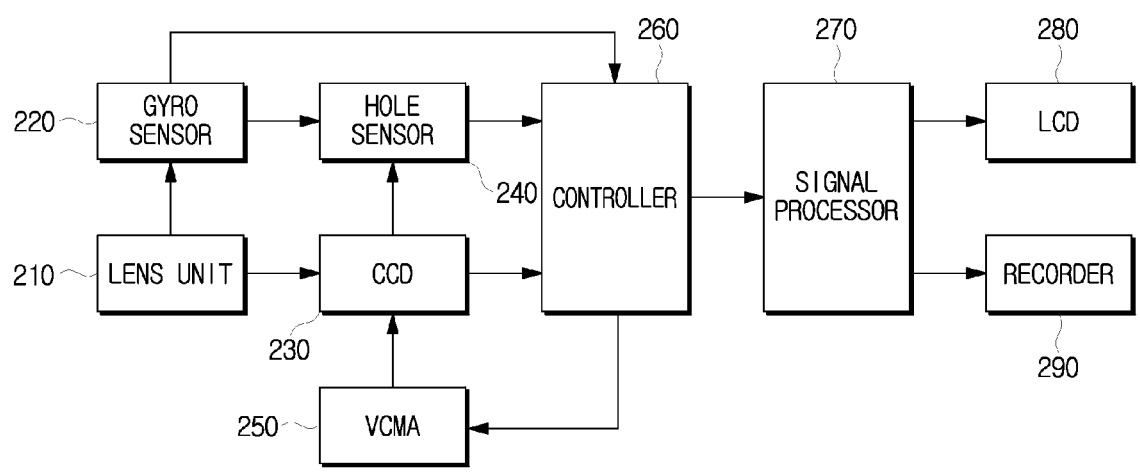
FIG. 2 is a block diagram illustrating a photographing apparatus according to the present general inventive concept.

FIG. 2 is a block diagram illustrating a photographing apparatus according to the present general inventive concept.

A photographing apparatus according to the present general inventive concept adopts a photographing element driving method as an auto stabilization of hand tremor, and employs a voice coil motor actuator (VCMA) to drive a photographing element. The photographing apparatus controls hand tremor compensation in consideration of dynamic characteristic of a VCMA structure, and thus provides improved compensation.

Referring to FIG. 2, the photographing apparatus according to the present general inventive concept includes a lens unit 210, a gyro sensor 220, a charge coupled device (CCD) 230, a hole sensor 240, a voice coil motor actuator (VCMA) 250, a controller 260, a signal processor 270, a liquid crystal display (LCD) 280, and a recorder 290.

The gyro sensor 220 may be attached to the lens unit 210, to detect vibration of the photographing apparatus. The CCD 230 is a photographing element to convert an optical image being received through the lens unit 210 into an electric signal and outputs it. The hole sensor 240 detects a position of the CCD 230 with respect to a reference of the VCMA 250.

The VCMA 250 includes a main frame, a yaw-axis driving frame, and a pitch-axis driving frame having the CCD 230 fixed thereon as the photographing element. The VCMA 250 moves the pitch-axis driving frame together with the CCD 230 fixed thereon according to the control of the controller 260 so that a center of the CCD 230 is aligned with an optical axis of the lens unit 210. The VCMA 250 may have a similar structure of a conventional VCMD of FIG. 1.

The main frame may include an actuator having a coil to form a magnetic field with a magnetic of the yaw-axis driving frame and the pitch-axis driving frame to apply a magnetic force to the yaw-axis driving frame and the picture axis driving frame, so that the pitch-axis driving frame moves with respect to the yaw-axis driving frame, and the yaw-axis driving frame moves with respect to the main frame.

The controller 260 determines dynamic characteristics according to the position of the VCMA 250 and a size of an input to the VCMA 250, and accordingly controls the VCMA 250 by outputting a control signal.

The signal processor 270 processes a digital signal being received from the lens unit 210, and displays the processed image signal on the LCD 280. Upon photographing, the signal processor 270 compresses the processed digital signal into joint photographing coding experts group (JPEG) or moving picture experts group (MPEG) format, and sends the compressed signal to the recorder 290.

The recorder 290 writes the image signal sent from the signal processor 270 on a recording medium, or reads an image signal from a recording medium at a loaded position and sends the read signal to the signal processor 270.

Hereinbelow, a dynamic characteristic of the VCMA 250, and outputting a control signal according to the dynamic characteristic of the VCMA 250 will be explained in detail below.

Figure 3A:
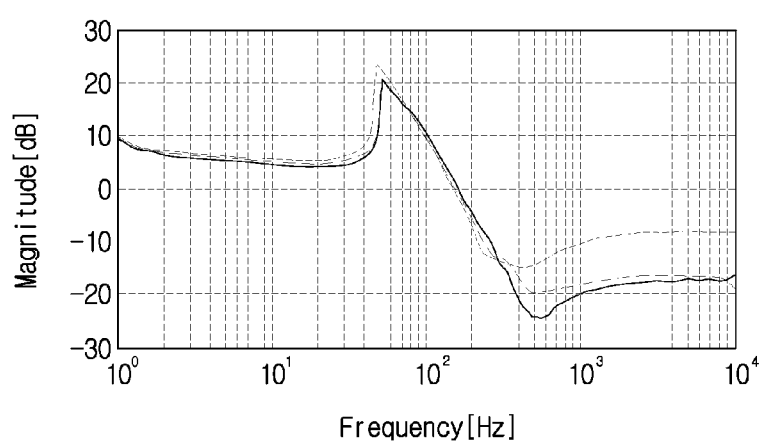
FIGS. 3A and 3B are graphical representations illustrating a pitch-axis frequency responsiveness of a VCMA according to position.
Figure 3B:
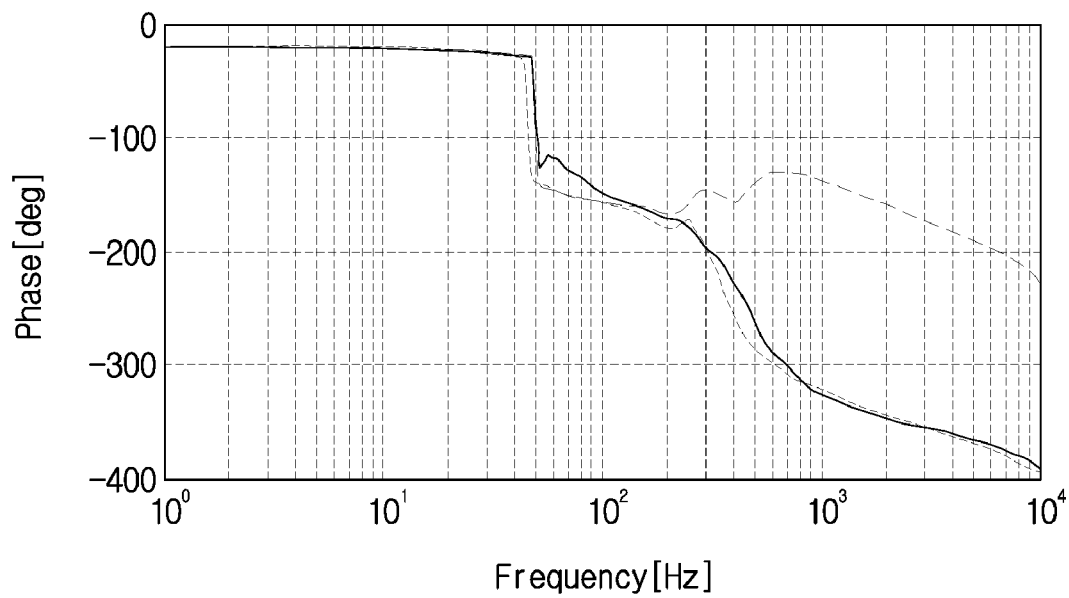

FIGS. 3A and 3B are graphical representations illustrating a pitch-axis frequency responsiveness of the VCMA 250 according to a position of the pitch-axis driving frame.

Referring to FIGS. 3A and 3B, pitch-axis frequency responsiveness of the VCMA 250 according to the position of the pitch-axis driving frame with respect to a reference position thereof, is illustrated.

In particular, FIG. 3A illustrates a gain (magnitude) by frequency, and FIG. 3B illustrates phase by frequency. The solid curve represents the results when the VCMA 250 is at a lying position, the phantom curve represents the results when the VCMA 250 is at an upright position, and the dashed curve represents results when the VCMA 250 is at an upside-down position.

Since the pitch-axis driving frame is movable with respect to the yaw-axis driving frame and the main frame, the pitch-axis frequency responsiveness is changed according to one of the positions, that is, the lying position, the upright position, or the upside-down position.

Referring to FIG. 3A, relatively lower sensitivity than an ideal free mass system appears in the low frequency band under 50 Hz due to influence of friction, while the sensitivity increases in the high frequency band above 300 Hz. That is, sensitivity greatly varies depending on a position of the VCMA 250.

The linearity is similar to that of an ideal free mass system in a middle frequency band ranging from 50 Hz to 300 Hz, and variation of a dynamic characteristic is not severe.

Figure 4A:
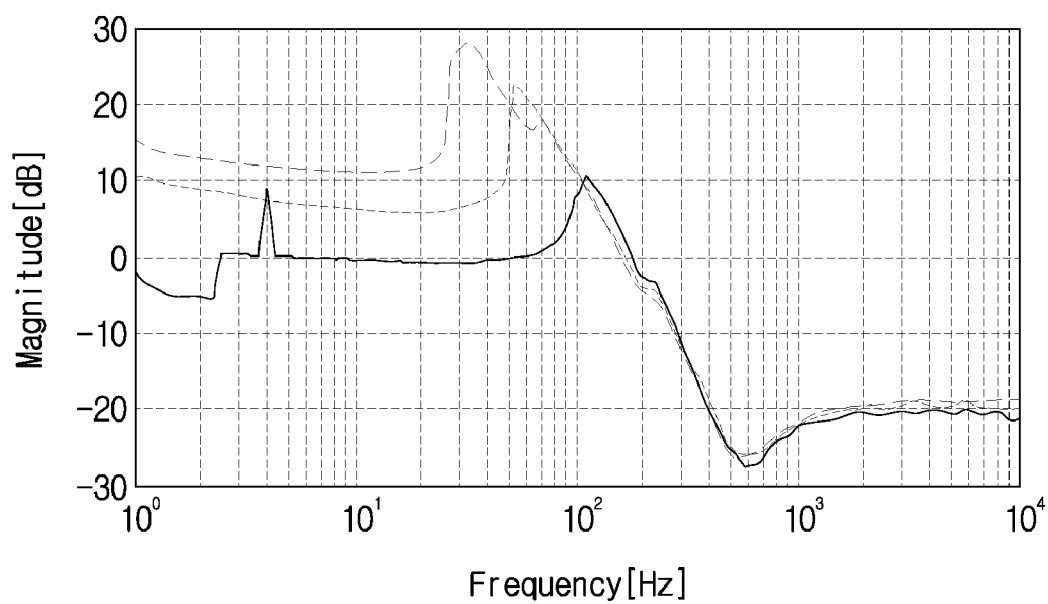
FIGS. 4A and 4B are graphical representations illustrating a pitch-axis frequency responsiveness of a VCMA according to a size of an input.
Figure 4B:
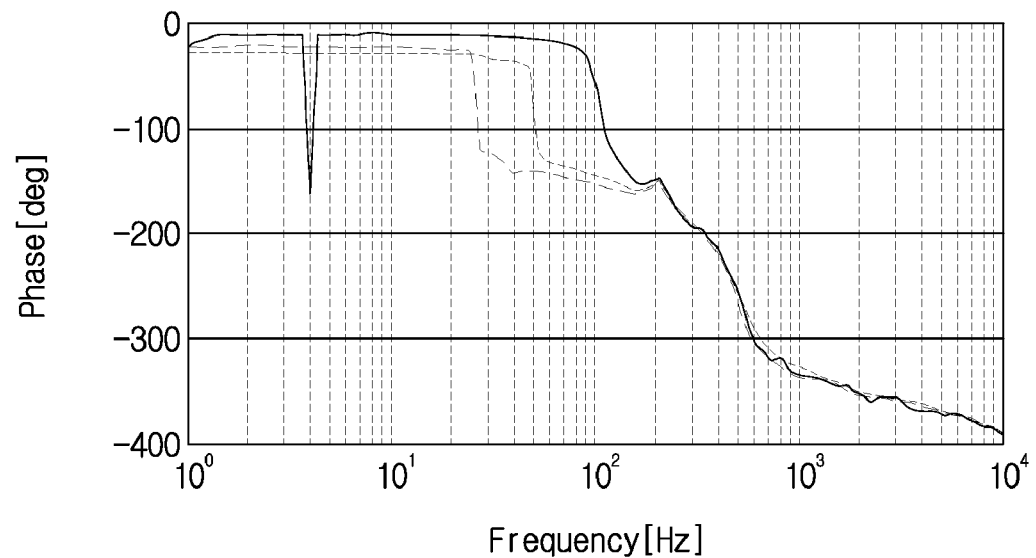

FIGS. 4A and 4B are graphical representations illustrating a pitch-axis frequency responsiveness of a VCMA according to a size of an input of the VCMA 250.

Since the pitch-axis driving frame is disposed to be movable with respect to the yaw-axis driving frame and the mainframe, the pitch-axis frequency responsiveness is changed according to the position and/or the input.

Referring to FIGS. 4A and 4B, frequency responsiveness varies according to the size of inputs to the pitch-axis driving frame of the VCMA 250. In particular, a solid curve represents frequency responsiveness appearing when the size of the input is 5 mVpk, a phantom curve represents the frequency responsiveness appearing when the size of the input is 10 mVpk, and a dashed curved represents the frequency responsiveness appearing when the size of the input is 15 mVpk.

Referring to FIG. 4A, sensitivity in the low frequency band increases as the size of the input increases. Because linearity of an ideal free mass system appears faster as the resonance frequency decreases, influence of friction disappears faster. The sensitivity in the high frequency band is not greatly influenced by the size of the input.

That is, although VCMA 250 is designed based on the model of a free mass system, the VCMA 250 has different hysteresis from the ideal free mass system. In the VCMA 250, dynamic characteristics vary according to different positions and sizes of input, such as sensitivity degradation in the low frequency band, or sensitivity increase in the high frequency band.

Accordingly, the controller 260 outputs a control signal, considering an error of an output signal from the hole sensor 240 with respect to the control signal input to the VCMA 250, and also considering one or more dynamic characteristic of the VCMA 250.

That is, the controller 260 sets gains of the control signal such that some of the frequency responses of the VCMA 250 have a same linearity as an ideal free mass system, and that gain cross frequency is generated in a middle frequency band where there is no variation of a dynamic characteristic due to position and size of input. A presence of gain cross frequency in the low frequency or high frequency band will cause responsiveness to vary according to the position and size of input, thus a phase margin corresponding to bandwidth cannot be secured.

The controller 260 then outputs a control signal to set a lowest gain among the responses in the low frequency band. For example, the controller 260 outputs a control signal to set the low frequency gain with reference to approximately 0 dB in the solid curve of FIG. 4A. If an error range of the output to the input control signal is within 5%, the controller 260 has to output a control signal to set the gain in the low frequency band to at least 26 dB or above.

The controller 260 sets a control signal such that phase margin in the gain cross frequency is approximately 30° or above. By doing so, stability of control is ensured.

The controller 260 also outputs a control signal such that a high frequency gain is set with respect to approximately −10 dB in a phantom curve of FIG. 3A where the response of the high frequency band has a highest gain. By designing such that the gain in the high frequency band is maintained below 0 dB, ingress of noise is prevented, and as a result, cross frequency other than the set gain cross frequency is not permitted in the middle frequency band.

Figure 5A:
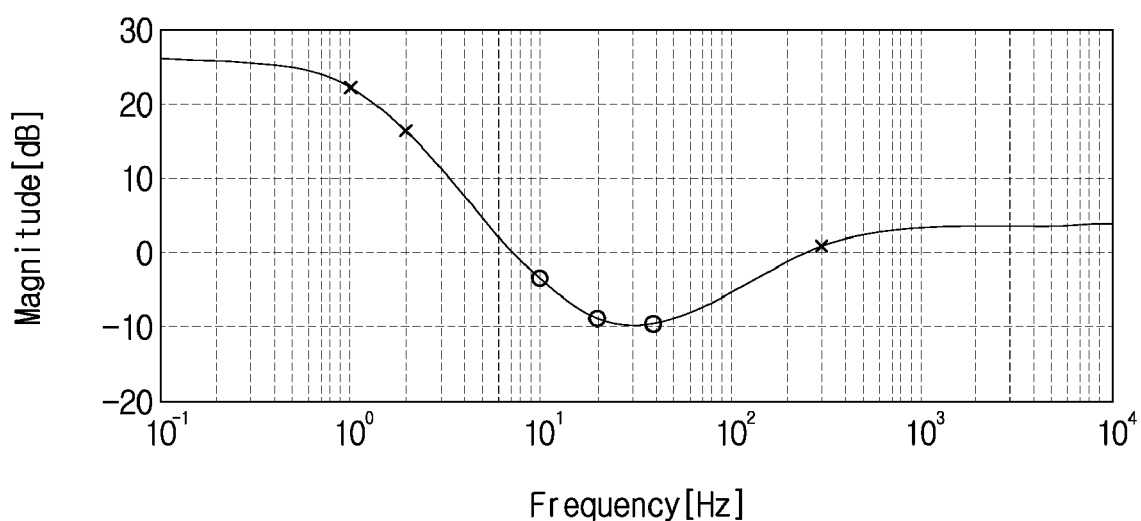
FIGS. 5A and 5B are graphical representations illustrating a frequency responsiveness of a controller employed in a photographing apparatus according to the present general inventive concept.
Figure 5B:
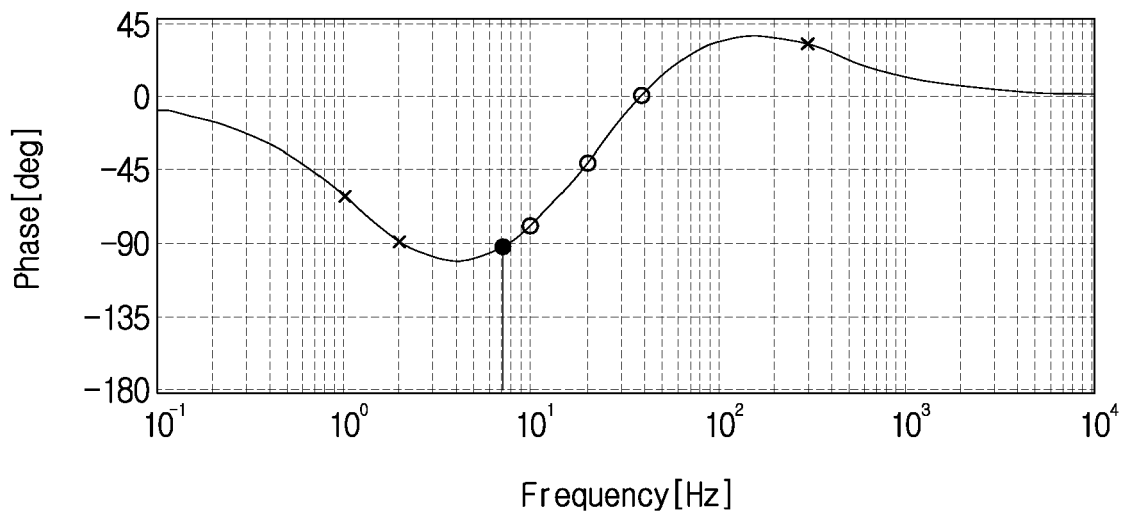

FIGS. 5A and 5B are graphical representations illustrating a frequency responsiveness of a controller employed in a photographing apparatus according to the present general inventive concept.

The controller 260 outputs a control signal to satisfy control requirements and in consideration of the dynamic characteristic of the VCMA 250 of FIGS. 3A and 3B, and FIGS. 4A and 4B, and the frequency responses of the controller 260 are expressed in graphical representation in FIGS. 5A and 5B.

In an exemplary embodiment of the present general concept, the controller 260 outputs a control signal to satisfy the control requirements such that poles are located at, for example, 1 Hz, 2 Hz, and 300 Hz (X marks), and zeros are located at, for example, 10 Hz, 20 Hz, and 40 Hz (o marks). The control requirements may include, for example, bandwidth, low frequency band gain, phase margin, and high frequency band gain. Referring to FIGS. 5A and 5B, a slope of the control signal may drop by an amount, for example, 10 dB, at a frequency having poles, and may rise by an amount, for example, 10 dB, at a frequency having zeros. Accordingly, the slope of the control signal may drop a 1 Hz (pole) and 2 Hz (pole), and may be at 0 degree around 300 Hz (pole).

Figure 6A:
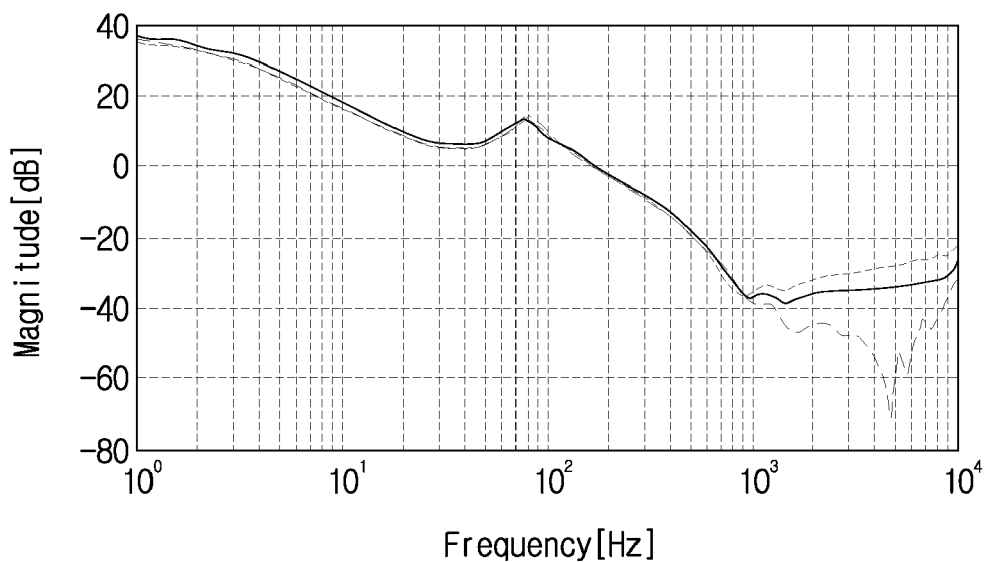
FIGS. 6A and 6B are graphical representations illustrating an open-loop frequency responsiveness of a photographing apparatus according to the present general inventive concept.
Figure 6B:
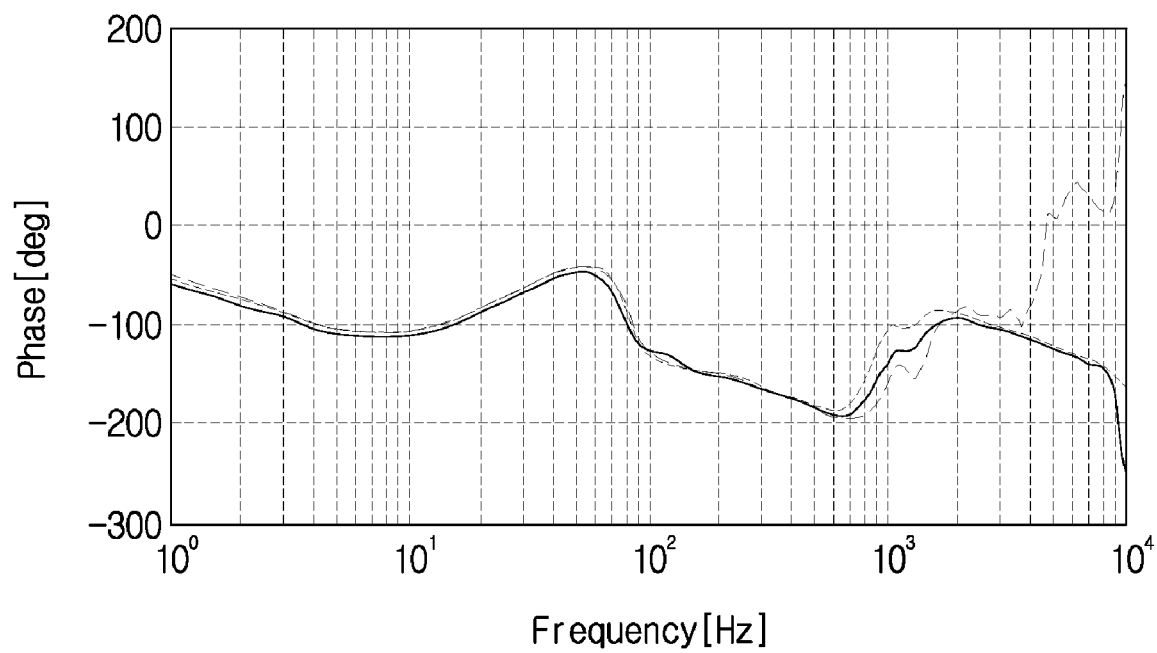

FIGS. 6A and 6B are graphical representations illustrating an open-loop frequency responsiveness of a photographing apparatus according to the present general inventive concept.

Because a control signal is output according to the control requirements and in consideration of the dynamic characteristic of the VCMA 250, gains are approximately 26 dB at or around 8 Hz where a vibration by hand tremor is dominant, and approximately 0 dB at or around approximately 160 Hz, and a corresponding phase margin is approximately 30°. Therefore, gain cross frequency does not occur in the high frequency band, and sufficient gain margin is provided regarding the phase cross frequency.

As explained above, better compensation is provided, compared to a conventional photographing apparatus, when the controller 260 controls VCMA 250 by outputting a control signal based on the difference between a control signal input to the VCMA 250 and an output signal from the hole sensor 240 in response to the input control signal.

Figure 7:
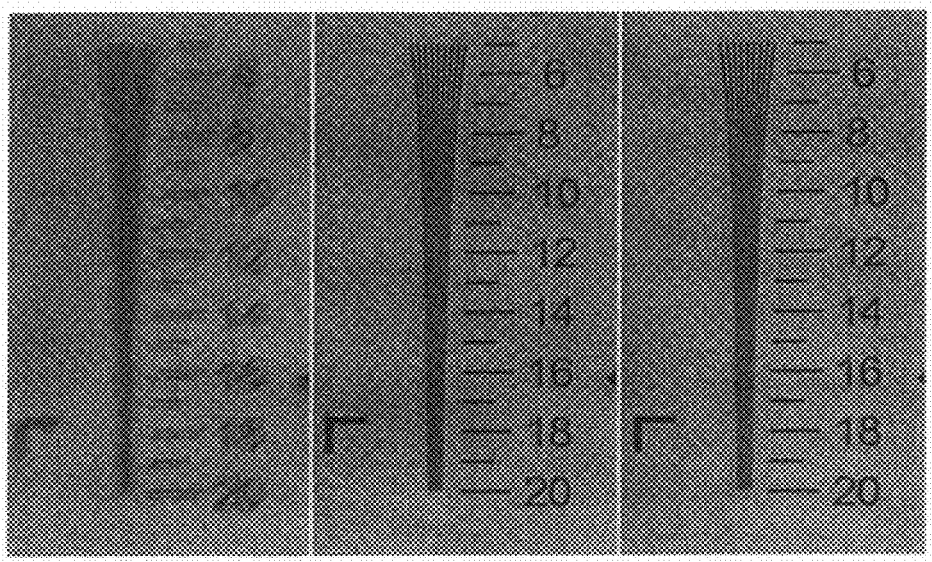
FIG. 7 are views to illustrate an effect of an auto stabilization apparatus according to the present general inventive concept.

FIG. 7 are views to illustrate an effect of an auto stabilization apparatus according to the present general inventive concept.

FIG. 7 illustrates images photographed, with vibration frequency set to 8.3 Hz, vibration angular displacement set to 0.3°, exposure time to reflect the vibration sufficiently set to ⅓ second, and optical zoom set to triple times.

In particular, the first image is photographed with an application of hand tremor, but without using auto stabilization function, the second image in the middle is photographed with the application of hand tremor, and with using auto stabilization function, and the third image is photographed without the application of hand tremor.

As illustrated in FIG. 7, an image has a much better resolution by using auto stabilization function, than an image which does not use auto stabilization function. The image using the auto stabilization function has almost the same resolution as the image photographed without the application of hand tremor.

Figure 8:
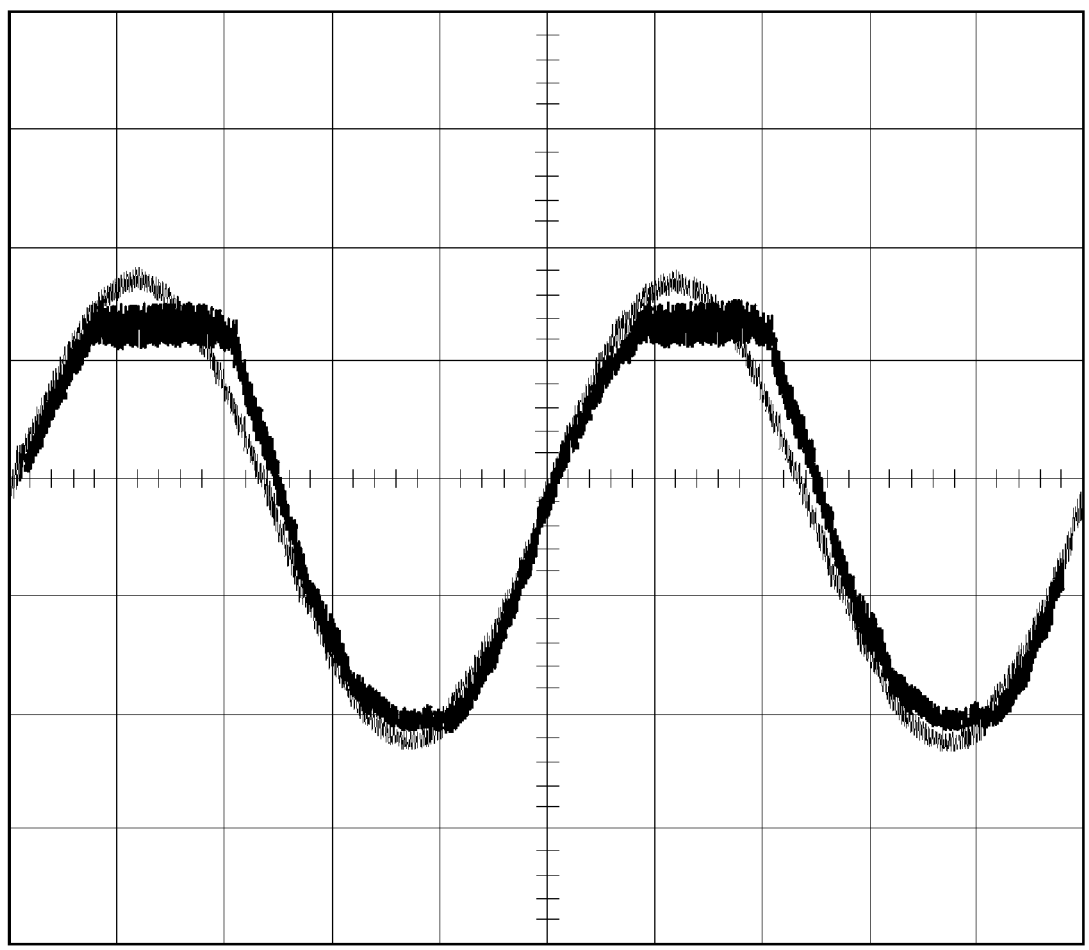
FIG. 8 is a graphical representation illustrating a pitch-axis saturation of a VCMA.

FIG. 8 is a graphical representation illustrating a pitch-axis saturation of a VCMA.

Referring to FIG. 8, the controller 260 inputs a sinusoidal wave as a control signal to the VCMA 250, and the hole sensor 240 outputs a signal after a predetermined time interval. The signal output from the hole sensor 240 indicates current position of the pitch-axis driving frame.

As illustrated in FIG. 8, a certain signal may have saturation among the signals which are output in response to the control signal after the predetermined time interval. This indicates that the CCD 230 is not moved exactly as directed by the control signal.

Accordingly, in order to prevent displacement saturation or delay due to surface illuminance of the ball guide 45 and the position of the ball 40 in the ball guide 45, the controller 260 adds a movement compensation signal to the control signal and outputs the result. The movement compensation signal set by the controller 260 has frequency and size to minimize negative influence on the stability and controlling so that an addition of movement compensation signal is not misinterpreted as a disturbance input and does not cause abnormal operation.

The controller 260 sets the frequency size of the movement compensation signal, based on the frequency size at which linearity among the dynamic characteristics of the VCMA 250 is maintained stable. This is, in consideration of a certain response characteristic is required in response to a movement compensation signal applied to the VCMA 250.

For example, referring to the pitch-axis frequency response of the VCMA 250 illustrated in FIGS. 3 and 4, because linearity is maintained stable at the frequency band of 100 Hz to 300 Hz, the controller 260 sets approximately 200 Hz as the frequency of a movement compensation signal.

Transfer function of a control signal for use in setting a size of movement compensation signal and an error signal, and transfer function of movement compensation signal and an error signal, may be expressed by:

$$\frac{e}{r} = \frac{1}{1+GC}, \frac{e}{v} = \frac{-G}{1+GC} \quad \text{[Mathematical formula 1]}$$

where r denotes a control signal, v is a movement compensation signal, e is an error signal, G is gain of the VCMA 250, and GC is open loop gain of a photographing apparatus.

Because the photographing apparatus according to the present general inventive concept has a large enough feedback ratio, an error is almost 0 when there is no movement compensation signal. Therefore, an error between a control signal and an output signal during the application of a movement compensation signal mainly depends on the size of the movement compensation signal, as expressed in mathematical formula 1. As the size of movement compensation signal increases, problems such as saturation or delay of displacement decrease. However, because error also increases, image quality may degrade. Accordingly, the controller 260 sets the size of a movement compensation signal within a range that image degradation is not noticeable.

Figure 9:
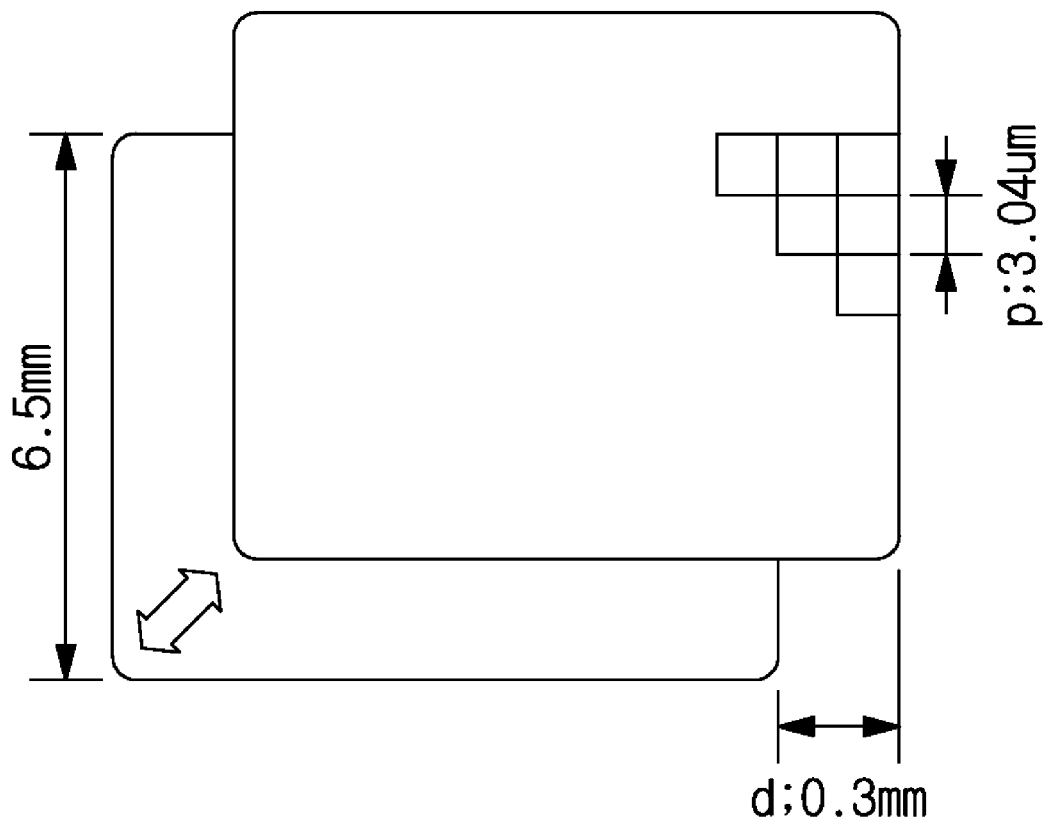
FIG. 9 is a view provided illustrating a process of setting a size of a movement control signal of a driving unit according to the present general inventive concept.

FIG. 9 is a view provided illustrating a process of setting a size of a movement control signal of a driving unit according to the present general inventive concept.

Referring to FIG. 9, displacement of the CCD 230 by the VCMA 250, and pixel size of the CCD 230 are illustrated.

In particular, the displacement 'd' of the CCD 230 by the VCMA 250 is 0.3 mm, and the pixel size 'p' of the CCD 250 is 3.04 μm. If three (3) pixels are within an error range, the allowable error range 'b' may be obtained by multiplying the pixel size by a number of pixels within the error range, and accordingly, b=3.04 μm*3=9.12 μm.

The allowable error range may be converted into voltage 'c' by:

$$d:1 = b:c \geq c = \frac{d}{b} \quad \text{[Mathematical formula 2]}$$

According to mathematical formula 2, output of the hole sensor 240 is normalized to 1V with respect to the displacement 'd' of the CCD 230 by the VCMA 250, and the allowable error range 'b' is converted into voltage 'c'. Converting allowable error range b=9.12 μm into voltage 'c' renders 30.4 mV.

The controller 260 determines the size of the movement compensation signal such that when the movement compensation signal is applied using transfer function between the movement compensation signal and an error signal of mathematical formula 1, the size of the error signal does not exceed the voltage 'c' which is converted from the allowable error range.

The size of the movement compensation signal may be expressed by:

$$\left|\frac{G}{1+GC}v\right|_{f[Hz]} < c \geq |v|_{f[Hz]} < \frac{c}{\left|\frac{G}{1+GC}\right|_{f[Hz]}} \quad \text{[Mathematical formula 3]}$$

where c denotes a voltage corresponding to an allowable error range, v is a movement compensation signal, G is gain of the VCMA 250, and GC is open loop gain of a photographing apparatus.

The controller 260 sets 200 Hz as the frequency of a movement compensation signal. Among the pitch-axis frequency responses of the VCMA 250 illustrated in FIGS. 3 and 4, gain G is −7 dB at the frequency 200 Hz of the VCMA 250. Among the open loop responses of the photographing apparatus illustrated in FIG. 6, the open loop gain of the photographing apparatus is −2 dB at the frequency 200 Hz. Accordingly, the controller 260 sets 122 mV as the upper limit of a movement compensation signal, based on mathematical formula 3.

Figure 10:
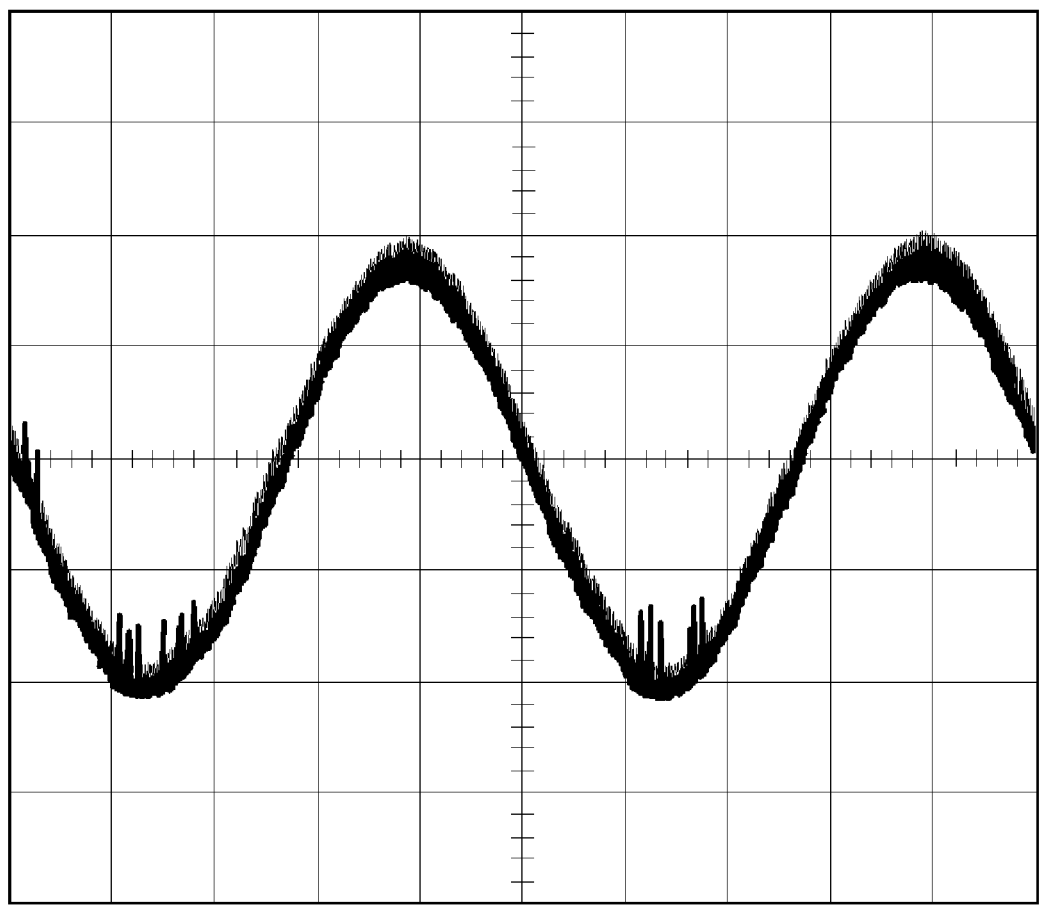
FIG. 10 is a graphical representation illustrating a result of movement control of a driving unit according to the present general inventive concept.

FIG. 10 is a graphical representation illustrating a result of movement control of a driving unit according to the present general inventive concept.

Referring to FIG. 10, the controller 260 inputs a control signal added with a movement compensation signal to the VCMA 250, and the hole sensor 240 outputs a signal after a predetermined time interval. In particular, FIG. 10 illustrates a result of applying a control signal added with 120 mV of movement compensation signal to the VCMA 250. As illustrated, saturation as illustrated in FIG. 8 is resolved.

Figure 11A:
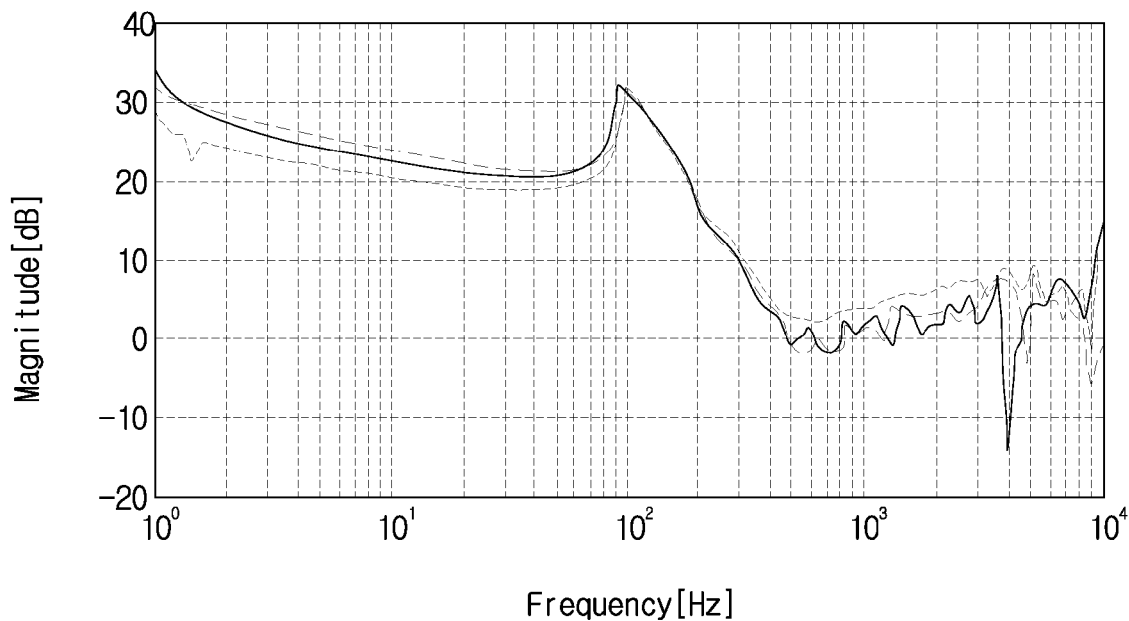
FIGS. 11A and 11B are graphical representations illustrating an effect of movement control of a driving unit according to the present general inventive concept.
Figure 11B:
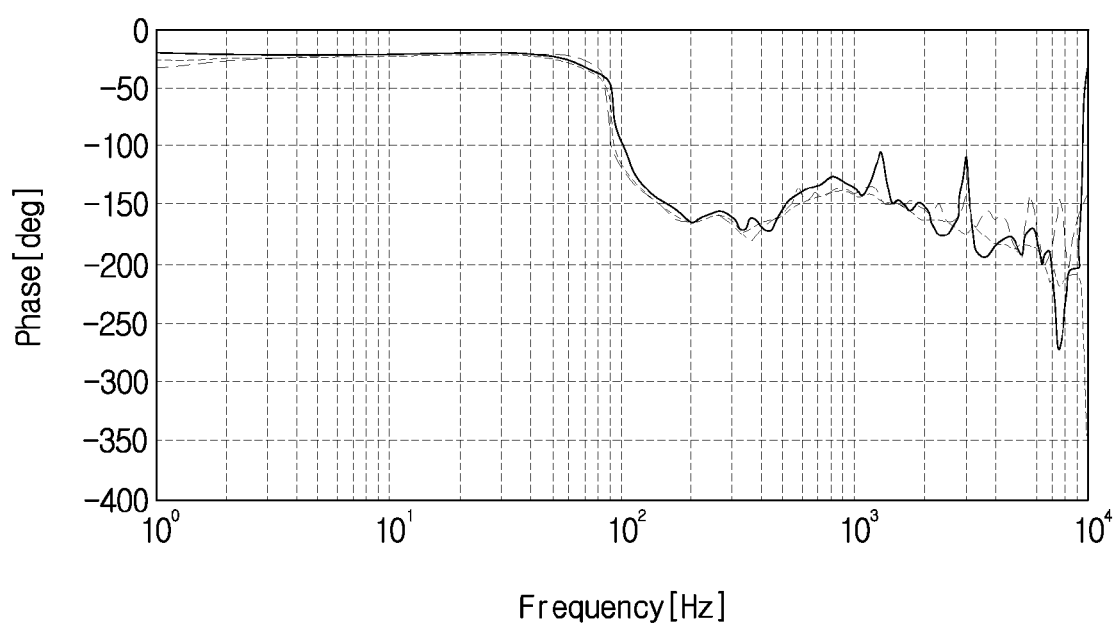

FIGS. 11A and 11B are graphical representations illustrating an effect of movement control of a driving unit according to the present general inventive concept.

Referring to FIGS. 11A and 11B, the frequency responses of the VCMA 250 in response to the control signal added with the movement compensation signal, are represented in the form of graphical data. A dotted curve represents an example where a movement compensation signal is not applied, a dashed curve represents an example where 200 Hz and 30 mV of movement compensation signal is applied, and a solid curve represents an example where 200 Hz, and 60 mV of movement compensation signal is applied.

By adding a movement compensation signal to a control signal, saturation and delay of displacement can be prevented, and low frequency sensitivity of the VCMA 250 is also enhanced. As a result, error in normal state is enhanced.

Figure 12:
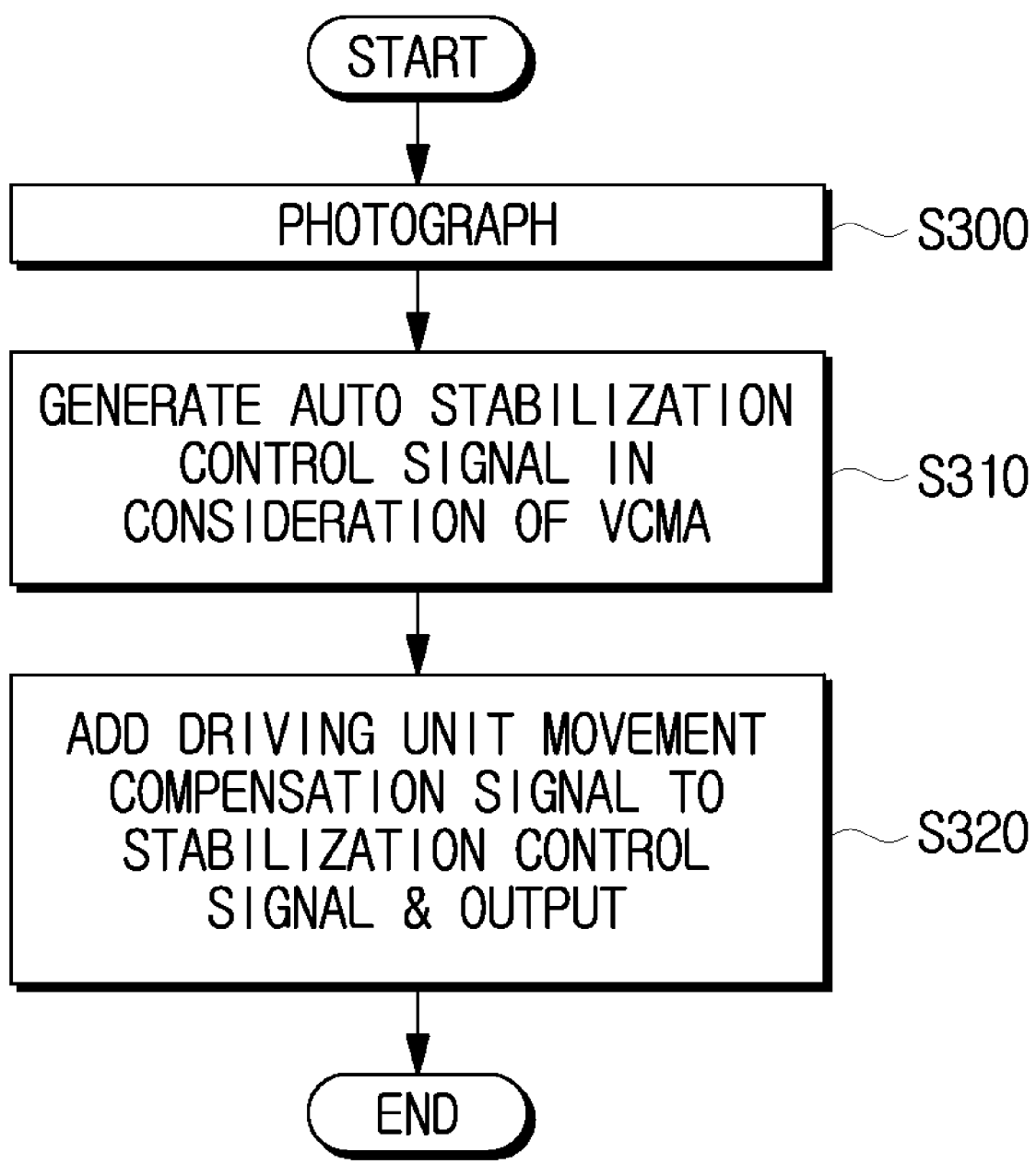
FIG. 12 is a flowchart illustrating a process of an auto stabilization method of a photographing apparatus according to the present general inventive concept.

FIG. 12 is a flowchart illustrating a process of an auto stabilization method of a photographing apparatus according to the present general inventive concept.

Referring to FIG. 12, the controller 260 controls the CCD 230 to photograph an image (operation S300). The controller 260 determines whether a photographing apparatus has a vibration, through the gyro sensor 220 attached to the lens unit 210. If vibration is detected, the controller 260 starts an auto stabilization function.

The controller 260 generates a hand tremor compensation control signal, in consideration of one or more dynamic characteristics of the VCMA 250 (operation S310). Generating a control signal according to the one or more dynamic characteristics of the VCMA 250 has already been explained above, and therefore, will not be explained below for the sake of brevity.

The photographic apparatus may be an apparatus having a lens unit and an element to photograph an object and to compensate for unstability of a signal corresponding to a photographed object, for example, hand tremor of a user controlling the photographic apparatus or any external force extended on the photographic apparatus.

The controller 260 adds a driving unit movement compensation signal to a compensation control signal, and outputs the signal to the VCMA 250 (operation S320). The hand tremor compensation control signal is used to move the CCD 230, in consideration of one or more dynamic characteristics which vary according to a position and size of an input, such as sensitivity deterioration in low frequency band, or sensitivity enhancement in high frequency band. The movement compensation signal is used to prevent saturation and delay of displacement of the VCMA 250.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As explained above, according to various exemplary embodiments of the present general inventive concept, enhanced form of auto stabilization is provided, which is much more efficient than a conventional apparatus which compensates hand tremor by compensating an error of an output signal in response to an input control signal.

As a result, clarity of image improves. Furthermore, saturation and delay of displacement are prevented, low frequency sensitivity of a driving unit improves, and erroneous operation of a driving unit is prevented.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of auto stabilization of a photographing apparatus, the method comprising:
generating a driving element control signal that moves a photographing element with respect to a reference to drive a driving element to compensate for a vibration caused due to hand tremor by considering dynamic characteristics of a driving element according to at least one of a position and a size of an input of the driving element;
adding a movement compensation signal according to at least one of a surface illuminance of a ball guide and a position of a ball of the driving element to control displacement of the driving element to the control signal; and
outputting the control signal including the movement compensation signal to the driving element.

2. The method of claim 1, wherein the generating comprises generating the driving element control signal by considering one or more dynamic characteristics according to at least one of sensitivity deterioration in low frequency band, sensitivity enhancement in high frequency band, position, and a size of an input of the driving element.

3. The method of claim 1, wherein the generating comprises:
generating the driving element control signal such that a low frequency gain is set with respect to a case having a lowest gain among frequency responses of the driving element in a low frequency band.

4. The method of claim 1, wherein the generating comprises:
generating the driving element control signal such that a phase margin in a gain cross frequency exceeds a predetermined level.

5. The method of claim 4, wherein the generating comprises:
generating the driving element control signal such that the phase margin in the gain cross frequency is approximately 30° or above.

6. The method of claim 1, wherein the generating comprises:
generating the driving element control signal such that a high frequency gain is set with respect to a case having a highest gain among responses of the driving element in a high frequency band.

7. The method of claim 1, wherein the driving element comprises:
a voice coil motor actuator (VCMA).

8. The method of claim 1, wherein the outputting comprises:
setting a frequency size of the driving element movement compensation signal based on the frequency size at which linearity is maintained stable among frequency responses of the driving element.

9. The method of claim 8, wherein the outputting comprises:
setting a size of the driving element movement compensation signal such that, if the movement compensation signal is applied at the set frequency size, a size of an error signal between the driving element control signal and an output signal in response to the driving element control signal does not exceed an allowable range, which is converted to a voltage level by using a transfer function between the driving element movement compensation signal and the error signal.

10. A photographing apparatus, comprising:
a photographing element to photograph an image;
a driving unit on which the photographing element is mounted, to move the photographing element; and
a controller to generate a driving unit control signal by considering one or more dynamic characteristics of the driving unit according to at least one of a position and a size of an input of the driving unit to compensate for vibration caused due to hand tremor, and to add a driving unit movement compensation signal according to at least one of a surface illuminance of a ball guide and a position of a ball of the driving element to control displacement of the driving unit to the driving unit control signal and output the driving unit control signal including the driving unit movement compensation signal to the driving unit.

11. The photographing apparatus of claim 10, wherein the controller generates the driving element control signal according to the one or more dynamic characteristics according to at least one of sensitivity deterioration in low frequency band, sensitivity enhancement in high frequency band, position, and a size of an input of the driving element.

12. The photographing apparatus of claim 10, wherein the controller sets the driving element control signal such that a gain cross frequency is generated in a middle frequency band which has a linearity among frequency responses of the driving element.

13. The photographing apparatus of claim 10, wherein the controller generates the driving element control signal such that a low frequency gain is set with respect to a case having a lowest gain among frequency responses of the driving element in a low frequency band.

14. The photographing apparatus of claim 12, wherein the controller generates the driving element control signal such that a phase margin in the gain cross frequency exceeds a predetermined level.

15. The photographing apparatus of claim 14, wherein the controller generates the driving element control signal such that the phase margin in the gain cross frequency is approximately 30° or above.

16. The photographing apparatus of claim 10, wherein the controller generates the driving element control signal such that a high frequency gain is set with respect to a case having a highest gain among responses of the driving element in a high frequency band.

17. The photographing apparatus of claim 10, wherein the driving unit comprises:
a voice coil motor actuator (VCMA).

18. The photographing apparatus of claim 10, wherein the controller sets a frequency size of the driving element movement compensation signal based on the frequency size at which the linearity is maintained stable among frequency responses of the driving element.

19. The photographing apparatus of claim 18, wherein the controller sets a size of the driving element movement compensation signal such that, if the movement compensation signal is applied at the set frequency size, a size of an error signal between the driving element control signal and an output signal in response to the driving element control signal does not exceed an allowable range, which is converted to a voltage level by using a transfer function between the driving element movement compensation signal and the error signal.

20. An auto stabilization unit usable with a photographing apparatus, the auto stabilization unit, comprising:
a detecting unit to detect vibration; and
a controller to compensate for the vibration by at least one of generating a driving unit control signal by considering at least one of one or more dynamic characteristics of a driving unit according to at least one of a position and a size of an input of the driving unit of the photographing apparatus and adding a driving unit movement compensation signal according to at least one of a surface illuminance of a ball guide and a position of a ball of the driving element to control displacement of the driving unit to the driving unit control signal.

21. A photographing apparatus, comprising:
a photographing element to photograph an image;
a driving unit coupled to the photographing element, and to move the photographing element; and
a controller to compensate for vibration by at least one of generating a driving unit control signal by considering at least one of one or more dynamic characteristics of a driving unit according to at least one of a position and a size of an input of the driving unit and adding a driving unit movement compensation signal according to at least one of a surface illuminance of a ball guide and position of a ball of the driving element to control displacement of the driving unit to the driving unit control signal.

22. The apparatus of claim 21, wherein the controller further comprises:
outputting the driving unit control signal including the driving unit movement compensation signal to the driving unit.

23. The apparatus of claim 22, wherein the controller comprises:
both of generating a driving unit control signal according to the one or more dynamic characteristics of the driving unit and adding a driving unit movement compensation signal to control displacement of the driving unit to the driving unit control signal.

24. The apparatus of claim 21, wherein the vibration is due to a hand tremor caused by a user.

25. The method of claim 1, wherein the generating comprises:
setting the driving element control signal such that a gain cross frequency is generated in a middle frequency band which has a linearity among frequency responses of the driving element.

* * * * *